(12) United States Patent
Shindo

(10) Patent No.: US 8,761,772 B2
(45) Date of Patent: Jun. 24, 2014

(54) PROCESSING APPARATUS, MOBILE COMMUNICATION SYSTEM, BASE STATION APPARATUS, METHOD FOR SWITCHING CONNECTION OF MOBILE STATION, AND NON-TRANSITORY COMPUTER READABLE MEDIUM STORING PROGRAM

(75) Inventor: Masato Shindo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/515,462

(22) PCT Filed: Dec. 16, 2010

(86) PCT No.: PCT/JP2010/007304
§ 371 (c)(1),
(2), (4) Date: Jun. 12, 2012

(87) PCT Pub. No.: WO2011/074264
PCT Pub. Date: Jun. 23, 2011

(65) Prior Publication Data
US 2012/0252457 A1    Oct. 4, 2012

(30) Foreign Application Priority Data

Dec. 17, 2009  (JP) ................................. 2009-286823

(51) Int. Cl.
*H04W 36/00* (2009.01)
(52) U.S. Cl.
USPC .......................................................... 455/436
(58) Field of Classification Search
USPC ................................. 455/436–448
See application file for complete search history.

(56) References Cited

U.S. PATENT DOCUMENTS

| | | | |
|---|---|---|---|
| 5,101,501 A | | 3/1992 | Gilhousen et al. |
| 6,021,123 A | * | 2/2000 | Mimura ........................ 370/331 |
| 6,192,232 B1 | | 2/2001 | Iseyama |
| 7,194,266 B2 | | 3/2007 | Ishikawa et al. |
| 7,702,334 B2 | | 4/2010 | Takaki |
| 2005/0078636 A1 | * | 4/2005 | Zhang et al. .................. 370/331 |
| 2008/0043672 A1 | * | 2/2008 | Sebire et al. ................. 370/331 |
| 2009/0201876 A1 | | 8/2009 | Morimoto et al. |

FOREIGN PATENT DOCUMENTS

| | | |
|---|---|---|
| CN | 1370021 A | 9/2002 |
| CN | 1606266 A | 4/2005 |
| CN | 1798448 A | 7/2006 |
| JP | 11-243584 A | 9/1999 |

(Continued)

OTHER PUBLICATIONS

Alcatel-lucent, Reducing PSC Confusion for Legacy UEs, R2-094254, 3GPP TSG-RAN WG2, Aug. 2009, pp. 1-2.

(Continued)

*Primary Examiner* — Joel Ajayi
(74) *Attorney, Agent, or Firm* — Foley & Lardner LLP

(57) ABSTRACT

A processing apparatus operates aiming to realize handover to each mobile station while reducing a failure rate of the handover even when PSC Confusion is generated. More specifically, when a connection of the mobile station is switched from a first base station to a second base station, the processing apparatus determines the second base station by selecting from a plurality of base stations according to connection history information indicating a success or a failure of past switching of the connection from the first base station to at least one of the plurality of base stations.

16 Claims, 20 Drawing Sheets

(56) References Cited

FOREIGN PATENT DOCUMENTS

| | | |
|---|---|---|
| JP | 2002-232929 A | 8/2002 |
| JP | 2006-311475 A | 11/2006 |
| WO | WO 2008/133566 A1 | 11/2008 |

OTHER PUBLICATIONS

3GPP TS 25A67, UTRAN Architecture for 3G Home Node B (HNB), Stage 2, $3^{rd}$ Generation Partnership Project, Technical Specification Group Radio Access Network, V9.0.1, 2009, pp. 27 pages.

* cited by examiner

| PSC | RNC-ID | UARFCN |
|-----|--------|--------|
| 2 | BB | X |
| 3 | CC | X |
| 2 | DD | X |

HNB#b
HNB#c
HNB#d

| HNB ID | Primary Scrambling Code | UARFCN |
|---|---|---|
| #a | 1 | X |
| #b | 2 | X |
| #c | 3 | X |
| #d | 2 | X |

Fig. 5

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| Primary Scrambling Code | O | | INTEGER (0..511) | | YES | reject |
| UARFCN | O | | INTEGER (0..16383) | | YES | reject |

Fig. 6

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| CN Domain ID | M | | 9.2.6 | | YES | reject |
| ContextID | M | | 9.2.2 | | YES | reject |
| RANAP Message | M | | 9.2.5 | | YES | reject |
| Confusion flag | O | | Enumerated (true) | | YES | ignore |

Fig. 7

| HANDOVER SOURCE RNC-ID | AA (HNB#a) | | BB (HNB#b) | | CC (HNB#c) | | DD (HNB#d) | |
|---|---|---|---|---|---|---|---|---|
| | NO. OF SUCCESSES | NO. OF FAILURES | NO. OF SUCCESSES | NO. OF FAILURES | NO. OF SUCCESSES | NO. OF FAILURES | NO. OF SUCCESSES | NO. OF FAILURES |
| AA (HNB#a) | — | — | 0 | 0 | 0 | 0 | 0 | 1 |
| BB (HNB#b) | 0 | 0 | — | — | 0 | 0 | 0 | 0 |
| CC (HNB#c) | 0 | 0 | 0 | 0 | — | — | 0 | 0 |
| DD (HNB#d) | 0 | 0 | 0 | 0 | 0 | 0 | — | — |

Fig. 9

| HANDOVER SOURCE | RANKING | HANDOVER DESTINATION |
|---|---|---|
| AA (HNB#a) | 1 | BB (HNB#b) |
| | 2 | DD (HNB#d) |

Fig. 11

| IE/Group Name | PRESENCE | RANGE | IE Type and Reference | Semantics Description | Criticality | Assigned Criticality |
|---|---|---|---|---|---|---|
| Choice Target ID | | | | | – | |
| >Target RNC-ID List | | 1 to <maxnumofrncidlist> | | | – | |
| >>LAI | M | | 9.2.3.6 | | – | |
| >>RAC | O | | 9.2.3.7 | | – | |
| >>RNC-ID | M | Integer (0..4095) | 9.2.3.6 | If the Extended RNC-ID IE is included in the Target ID IE, the RNC-ID IE shall be ignored. In case of UMTS to E-UTRAN relocation, if included, this IE will contain the Corresponding RNC-ID of the target eNB. | – | |
| >> Extended RNC-ID | O | | 9.2.1.39a | The Extended RNC-ID IE shall be usedd if the RNC identity has a value larger than 4095. | YES | reject |
| ... | | | | | – | |

Fig. 14A

| Range Bound | Explanation |
|---|---|
| maxnumofrncidlist | Maximum no. of RNC-ID list. Value is 16. |

Fig. 14B

| PSC | RNC-ID | UARFCN | NO. OF HANDOVER SUCCESSES | NO. OF HANDOVER FAILURES | |
|---|---|---|---|---|---|
| 2 | BB | X | 0 | 0 | HNB#b |
| 3 | CC | X | 0 | 0 | HNB#c |
| 2 | DD | X | 0 | 0 | HNB#d |

| PSC | RNC-ID | UARFCN | NO. OF HANDOVER SUCCESSES | NO. OF HANDOVER FAILURES |
|---|---|---|---|---|
| 2 | BB | X | 0 | 0 | ← HNB#b
| 3 | CC | X | 0 | 0 | ← HNB#c
| 2 | DD | X | 0 | 1 | ← HNB#d

Fig. 17

PROCESSING APPARATUS, MOBILE COMMUNICATION SYSTEM, BASE STATION APPARATUS, METHOD FOR SWITCHING CONNECTION OF MOBILE STATION, AND NON-TRANSITORY COMPUTER READABLE MEDIUM STORING PROGRAM

This application is the National Phase of PCT/JP2010/007304, filed Dec. 16, 2010, which claims priority to Japanese Application No. 2009-286823, filed Dec. 17, 2009, the disclosures of which are hereby incorporated by reference in their entirety.

TECHNICAL FIELD

The present invention relates to a handover method in a mobile communication system, and particularly to a handover method in a mobile communication system regarding HNB (Home Node B).

BACKGROUND ART

Currently, the development of small base stations that can be installed in a user's house, office, and the like have been advanced. 3GPP (Third Generation Partnership Project) defines such a small base station as Home Node B (HNB), and proceeds with standardization.

In 3GPP, a spreading code called PSC (Primary Scrambling Code) is defined. The PSC is defined in a range of 512 from 0 to 511. In the HNB, one cell (area where the HNB can communicate) can use only one PSC. Further, one cell must use one PSC.

A handover procedure between the HNBs agreed in 3GPP Release 9 is explained below (NPL 1). The following explanation assumes Intra HNB-GW and Intra CSG. The Intra HNB-GW indicates the state where the HNB to which a mobile station (UE) is connected (hereinafter referred to as a Source HNB) and the HNB to be a handover destination (hereinafter referred to as a Target HNB) are connected to the same HNB-GW (Home Node B Gateway). Further, the Intra CSG (Closed Subscriber Group) indicates that the Source HNB and the Target HNB are broadcasting the same CSG-ID. Note that the CSG is a method for realizing access control to the HNB defined in the 3GPP Release 8. The HNB to which this method is applied is assigned with a certain CSG-ID and broadcasts it inside its own cell. The UE accesses the HNB only when the communication to the CSG-ID is allowed.

FIG. 20 is a sequence diagram showing the handover procedure between the HNBs agreed in the 3GPP Release 9. First, the UE is in the state of communication with CS (Circuit Switch) or PS (Packet Switch) (S101).

When the UE satisfies the condition to execute handover from the HNB in communication (Source HNB) to another HNB (Target HNB), PSC used by the Target HNB is notified to the Source HNB by an RRC (Radio Resource Control):MEASUREMENT REPORT message (S102). The UE identifies the HNB by the PSC.

When the Source HNB receives the RRC:MEASUREMENT REPORT message from the UE, the Source HNB identifies the Target HNB by the PSC included in the message. Each HNB holds information (PSC, Cell ID, RNC-ID, frequency information, and the like) of neighbor HNBs. Note that the RNC-ID (Radio Network Controller Identifier) indicates an ID assigned to each HNB. Each HNB identifies the RNC-ID of the HNB which uses the received PSC according to the information held by each HNB (S103).

The Source HNB transmits an RUA (RANAP User Adaption):DIRECT TRANSFER message including the RNC-ID of the Target HNB to the HNB-GW (S104). A RANAP:(Radio Access Network Application Part) RELOCATION REQUIRED message is encapsulated in the RUA:DIRECT TRANSFER message.

Note that the RANAP is signaling exchanged between RNC and CN (Core Network) in a macro network of a related art. In a network using the HNB, it is a protocol used between the HNB and the CN. Further, the RUA is a protocol used on an Iuh interface.

The HNB-GW which received the RANAP:RELOCATION REQUIRED message identifies the Target HNB with the corresponding RNC-ID (S105). The HNB-GW transmits the RANAP:RELOCATION REQUEST message encapsulated in the RUA message to the Target HNB (S106). Note that the name of the RUA message is still not determined at the present stage. In the following explanation, the message with an undetermined name is referred to as "XXX" (for example, RUA:XXX) in each protocol specification.

When the Target HNB receives RANAP:RELOCATION REQUEST message, the Target HNB registers information on the UE that performs handover and secures a resource for the UE (S107). Then, the Target HNB transmits the RUA:DIRECT TRANSFER message encapsulating a RANAP:RELOCATION REQUEST ACKNOWLEDGE message to the HNB-GW (S108).

The HNB-GW which received the RUA:DIRECT TRANSFER message transmits a RANAP:RELOCATION COMMAND message to the Source HNB (S109). After that, a wireless synchronous process (S111) is performed between the UE and the Target HNB. Next, the Target HNB notifies that the relocation is completed to the HNB-GW (S114). Then, the Source HNB completes a series of handover processes by the HNB releasing the resource of the UE (S116).

CITATION LIST

Non Patent Literature

NPL 1: 3GPP TS 25.467 "UTRAN architecture for 3G Home Node B (HNB); Stage 2", 3GPP, Searched on Nov. 24, 2009, the Internet <URL:http://www.3gpp.org/ftp/Specs/archive/25_series/25.467/25467-901.zip>

SUMMARY OF INVENTION

Technical Problem

However, there is a problem generated that in the above-mentioned HNB procedure, the handover is not normally executed when PSC Confusion is generated. Details of the problem are explained below.

The problem is generated when the same PSC as the PSC for a cell of the HNB, which is a desired handover destination, is used by another cell when the UE performs handover. This state is referred to as the PSC Confusion. When the PSC Confusion is generated, it becomes difficult for the Source HNB to accurately determine the Target HNB in S103 of FIG. 20. That is, when a plurality of HNBs have the same PSC, it becomes difficult to identify the RNC-ID of the Target HNB.

A system for the Source HNB to select one HNB (select the RNC-ID) as the Target HNB at random is examined here. Even in this system, when the Source HNB selects a different HNB from the HNB desired by the UE to be the handover destination, the handover fails.

Accordingly, in order to prevent from generating failures in the handover, even when the PSC Confusion is generated, it is required to increase the success rate of the handover.

The present invention is made in order to solve such a problem, and aims to provide a mobile communication system that can reduce the failure rate of the handover even when the PSC Confusion is generated.

Solution to Problem

An exemplary aspect of the present invention is a mobile communication system that includes a first base station that generates a first cell and can be connected to a mobile station, a gateway apparatus that communicatively connects the first base station and a plurality of base stations to a higher-level network and a processing means that, when a connection of the mobile station is switched from the first base station to a second base station that is included in the plurality of base stations, selects the second base station from the plurality of base stations according to connection history information indicating a success or a failure of past switching of the connection from the first base station to at least one of the plurality of base stations.

Another exemplary aspect of the present invention is a processing apparatus that, when a connection of a mobile station is switched from a first base station to a second base station, selects the second base station from a plurality of base stations according to connection history information indicating a success or a failure of past switching of the connection from the first base station to at least one of the plurality of base stations.

Another exemplary aspect of the present invention is a method for switching a connection of a mobile station that includes evaluating by a mobile station whether or not a condition for switching the connection from a first base station to a second base station is satisfied, and when the condition for switching the connection is satisfied, selecting the second base station from a plurality of base stations according to connection history information indicating a success or a failure of past switching of the connection from the first base station to at least one of the plurality of base stations.

Another exemplary aspect of the present invention is a base station apparatus that, when receiving a connection switch request from a mobile station in connection to a desired base station apparatus, transmits to a processing apparatus information of whether or not a same spreading code is assigned to the desired base station apparatus and another base station apparatus.

Another exemplary aspect of the present invention is a base station apparatus that transmits a spreading code and frequency information that is used by the base station apparatus to a processing apparatus for selecting the base station apparatus to which a mobile station is connected.

Another exemplary aspect of the present invention is a gateway apparatus for communicatively connecting a plurality of base stations to a higher-level network that stores spreading code information and frequency information used by at least one or more base stations, and when a connection of a mobile station is switched from a first base station to a second base station, selects the second base station from the plurality of base stations according to connection history information indicating a success or a failure of past switching of the connection from the first base station to at least one of the plurality of base stations.

A non-transitory computer readable medium storing a program according to the present invention that causes a computer to execute a process of controlling connection switch of a mobile station from a first base station to a second base station, in which the non-transitory computer readable medium stores a program that, when the connection of the mobile station is switched from the first base station to the second base station, selects the second base station from a plurality of base stations according to connection history information indicating a success or a failure of past switching of the connection from the first base station to at least one of the plurality of base stations.

Advantageous Effects of Invention

According to the present invention, it is possible to provide a mobile communication system that can reduce the failure rate of the handover even when the PSC Confusion is generated.

BRIEF DESCRIPTION OF DRAWINGS

FIG. 5 is a view showing a table in a database inside HNB-GW110 according to the first exemplary embodiment;

FIG. 6 is a view showing an HNB REGISTER REQUEST message according to the first exemplary embodiment;

FIG. 7 is a view showing an RUA:DIRECT TRANSFER message according to the first exemplary embodiment;

FIG. 9 is a view showing a table in a database storing history of handover results according to the first exemplary embodiment;

FIG. 11 is a view showing a list of handover destination candidates according to the first exemplary embodiment;

FIG. 14A is a view of Target ID included in a RANAP: RELOCATION REQUIRED message according to a second exemplary embodiment;

FIG. 14B is a view of the Target ID included in the RANAP:RELOCATION REQUIRED message according to the second exemplary embodiment;

FIG. 17 is a view showing a table in a database storing history of handover results according to the third exemplary embodiment;

DESCRIPTION OF EMBODIMENTS

Figure 1:
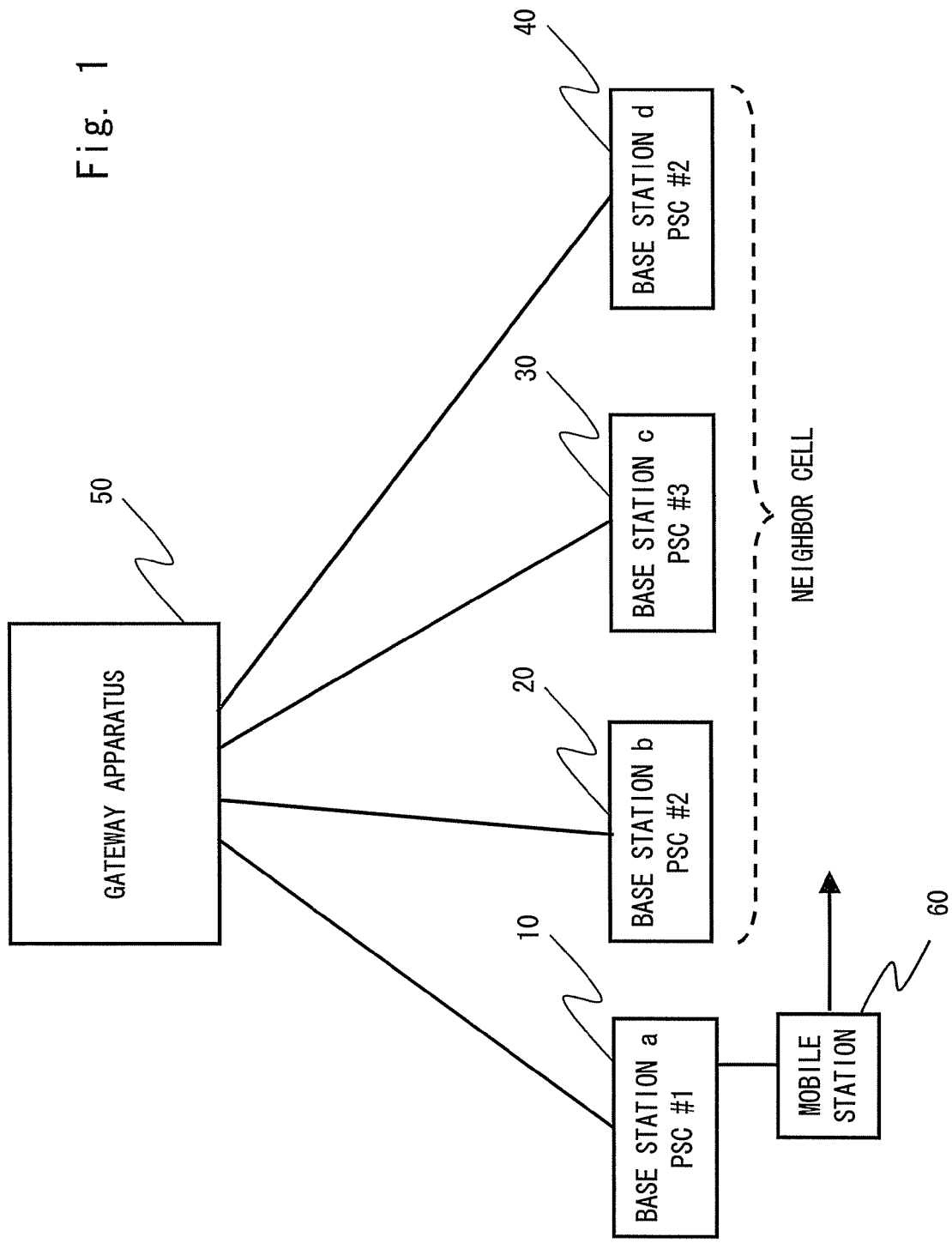
FIG. 1 is a block diagram showing a basic configuration of a mobile communication system according to a first exemplary embodiment.

Hereinafter, specific exemplary embodiments incorporating the present invention are explained in detail with reference to the drawings. Same components are denoted by the reference numerals in each drawing, and repeated explanation is omitted as necessary for the clarity of the explanation.

First Exemplary Embodiment

Hereinafter, an exemplary embodiment of the present invention is described with reference to the drawings. First, with reference to FIG. 1, a basic configuration of a mobile communication system and an overview of the operation thereof according to a first exemplary embodiment are explained.

A base station a10 holds information (PSC and the like) of a cell composed of the base station a10 and base stations (a base station b20, a base station c30, and a base station d40) that compose neighbor cells. A gateway apparatus 50 is disposed between the base stations a10, b20, c30, and d40 and a higher-level network (such as a core network of a carrier), and connects these base stations communicatively to the higher-level network. The gateway apparatus 50 relays user data and control data between these base stations and the higher-level network. Further, the gateway apparatus 50 performs signaling concerning the handover of a mobile station between the base stations a10, b20, c30, and d40. A mobile station (UE) 60 of the mobile communication system is connected to the base station a10, and moves to be close to the base station b20. When the mobile station 60 satisfies the condition to switch the connection from the base station a10 to the base station b20, the mobile station 60 transmits PSC=2, which is an identification code of the base station b20, to the base station a10. Between the base stations (the base station b20 and the base station d40) with the same PSC, the base station a10 or the gateway apparatus 50 selects the base station with high success of the connection switching from the base station a10. The base station a10 or the gateway apparatus 50 switches the connection of the mobile station 60 to the selected base station.

Figure 2:
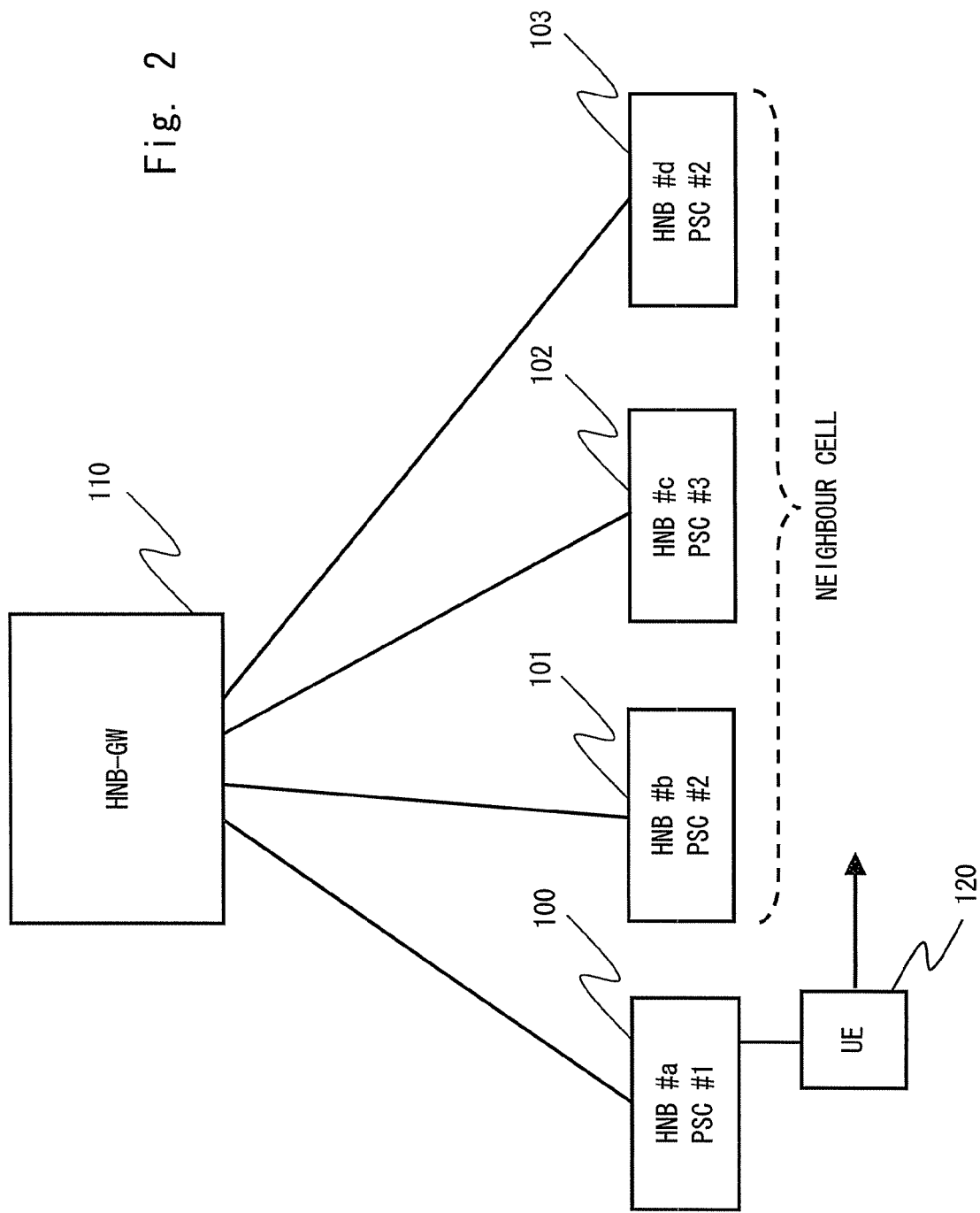
FIG. 2 is a block diagram showing the basic configuration of the mobile communication system according to the first exemplary embodiment.

Next, details of the exemplary embodiment of the present invention are explained with reference to the drawings. FIG. 2 is a view showing a configuration of the mobile communication system according to this exemplary embodiment. FIG. 2 shows the state in which an UE 120 moves from a HNB # a100 cell to a HNB # b101 cell. As neighbor cells of the HNB # a100, there are the HNB # b101 cell, a HNB # c102 cell, and a HNB # d103 cell.

PSC#1 is set to the HNB # a100 cell. Similarly, PSC#2 is set to the HNB # b101 cell. PSC#3 is set to the HNB # c102 cell. PSC#2 is set to the HNB # d103. The HNB # a100 recognizes the HNB # b101, the HNB # c102, and the HNB # d103 as neighbor HNBs. That is, the HNB # a100 includes information (PSC, RNC-ID, and frequency information) on the HNB # b101, the HNB # c102, and the HNB # d103.

Moreover, HNB-GW110 is configured to be mutually communicative with the HNB # a100, the HNB # b101, the HNB # c102, and the HNB # d103.

Figures 3, 4:
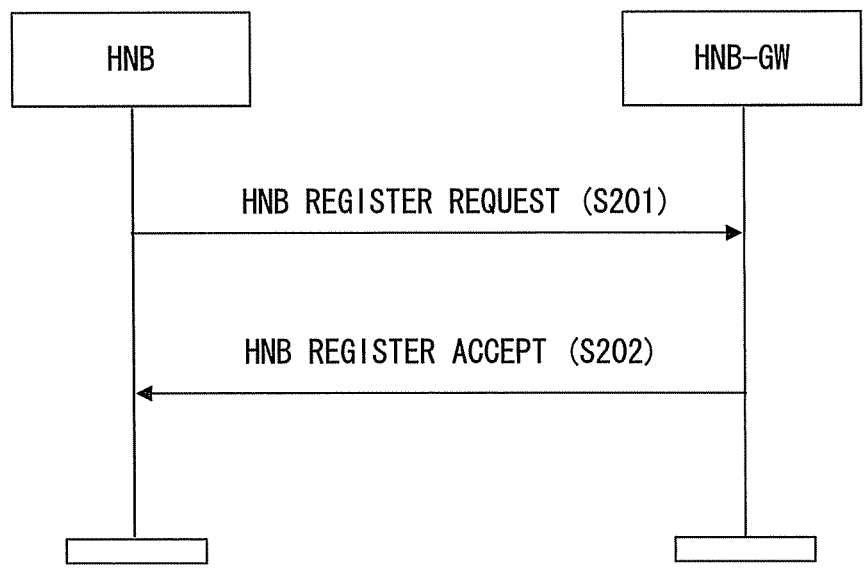
FIG. 3 is a view showing a list of neighbor cells held by HNB # a100 according to the first exemplary embodiment.
FIG. 4 is a view showing a process overview of a HNB Registration Procedure of HNBAP according to the first exemplary embodiment.

FIG. 3 shows a list of the neighbor cells held by the HNB # a100. In other words, it is the list of information (PSC, RNC-ID, and UARFCN (frequency information)) on the neighbor HNBs held by the HNB # a100. For example, the HNB # a100 recognizes "2" as the PSC, "BB" as the RNC-ID, and "X" as the frequency for the HNB # b101.

Next, FIG. 4 shows an overview of an HNB Registration Procedure of HNBAP (Home Node B Application Part Signaling). Each HNB notifies the information on the HNB to the HNB-GW110 by the procedure shown in FIG. 4 at the time when the operation is started (S201). Specifically, the HNB notifies the information on the HNB by a HNB REGISTER REQUEST message at the time when the operation is started. Note that for details of the HNB Registration Procedure of the HNBAP (Home Node B Application Part Signaling), see Section 8.2 in 3GPP Release 8 TS25.469.

The HNB-GW110 which received the HNB REGISTER REQUEST message stores the information on the HNB to a table in a database included inside. FIG. 5 is a view showing the table in the database inside the HNB-GW110. The HNB-GW110 holds the information on the PSC and the UARFCN which are used by each HNB that can communicate with the HNB-GW110.

After that, the HNB-GW110 transmits an HNB REGISTER ACCEPT message to the HNB (S202). The above procedure enables the HNB-GW110 to provide necessary services to the HNB. Further, the abovementioned procedure enables the HNB-GW110 to exchange the information with the HNB and a Core Network.

Note that although the HNB Registration Procedure is defined in the 3GPP Release 8, the corresponding part is not due to be changed in the 3GPP Release 9.

FIG. 6 is a view showing the HNB REGISTER REQUEST message transmitted by the HNB according to this exemplary embodiment. In the HNB REGISTER REQUEST message transmitted by the HNB according to this exemplary embodiment, parameters "Primary Scrambling Code" and "UARFCN" are newly defined in addition to existing parameters of the HNB REGISTER REQUEST message. The "Primary Scrambling Code" is a parameter indicating a value of the PSC assigned to the HNB that transmits the HNB REGISTER REQUEST message. The "UARFCN" (UMTS (Universal Mobile Telecommunications System) Absolute Radio Frequency Channel Number) is a parameter indicating the frequency used by the HNB that transmits the HNB REGISTER REQUEST message. Note that for details of the HNB REGISTER REQUEST message, see Section 9.1.3 of the 3GPP Release 8 TS25.469.

FIG. 7 describes details of an RUA:DIRECT TRANSFER message transmitted from the HNB according to this exemplary embodiment to the HNB-GW110. In the RUA:DIRECT TRANSFER transmitted by the HNB according to this exemplary embodiment, a parameter called "Confusion flag" is newly defined in addition to existing parameters of the RUA: DIRECT TRANSFER. The "Confusion flag" is a parameter used when the PSC Confusion is generated in order for the HNB to notify to that effect. When the PSC Confusion is generated, the HNB sets the "Confusion flag" to "TRUE", and transmits the RUA:DIRECT TRANSFER message to the HNB-GW110. Note that for details of the RUA:DIRECT TRANSFER message, see Section 9.1.4 of the 3GPP Release 8 TS25.468.

Note that in this exemplary embodiment, although the RUA:DIRECT TRANSFER message defines whether or not the PSC Confusion is generated, it is not limited to this. For example, the generation of the PSC Confusion may be notified by describing the content in the RANAP message encapsulated inside the RUA:DIRECT TRANSFER message.

Next, an operation of each components (HNB, HNB-GW, UE, and the like) of the mobile communication system according to this exemplary embodiment is explained. First, the procedure of the HNB Registration is explained with reference to FIGS. 4 and 5.

The HNB notifies the information on the HNB to the HNB-GW110 by the HNB REGISTER REQUEST message at the time when the operation is started (S201). At this time, the HNB REGISTER REQUEST message includes the "Primary Scrambling Code" and the "UARFCN".

The HNB-GW110 which received the HNB REGISTER REQUEST message stores the "Primary Scrambling Code" and the "UARFCN" received from each HNB to the database inside. The table in the database shown in FIG. 5 stores the information on the "Primary Scrambling Code" and the "UARFCN" of the four HNBs (HNB # a, HNB # b, HNB # c, and HNB # d) in the HNB-GW110. Note that in FIG. 5, all the four HNBs use the same frequency ("X").

After the HNB-GW110 stores the information on the "Primary Scrambling Code" and the "UARFCN" to the table in the database, the HNB-GW110 transmits an HNBAP:HNB REGISTRATION ACCEPT message to the HNB that transmitted HNB REGISTER REQUEST message (S202). The process of the HNB Registration is completed by transmitting the HNBAP:HNB REGISTRATION ACCEPT message. Note that there is no change in the HNBAP:HNB REGISTRATION ACCEPT message from the existing message.

Figure 8:
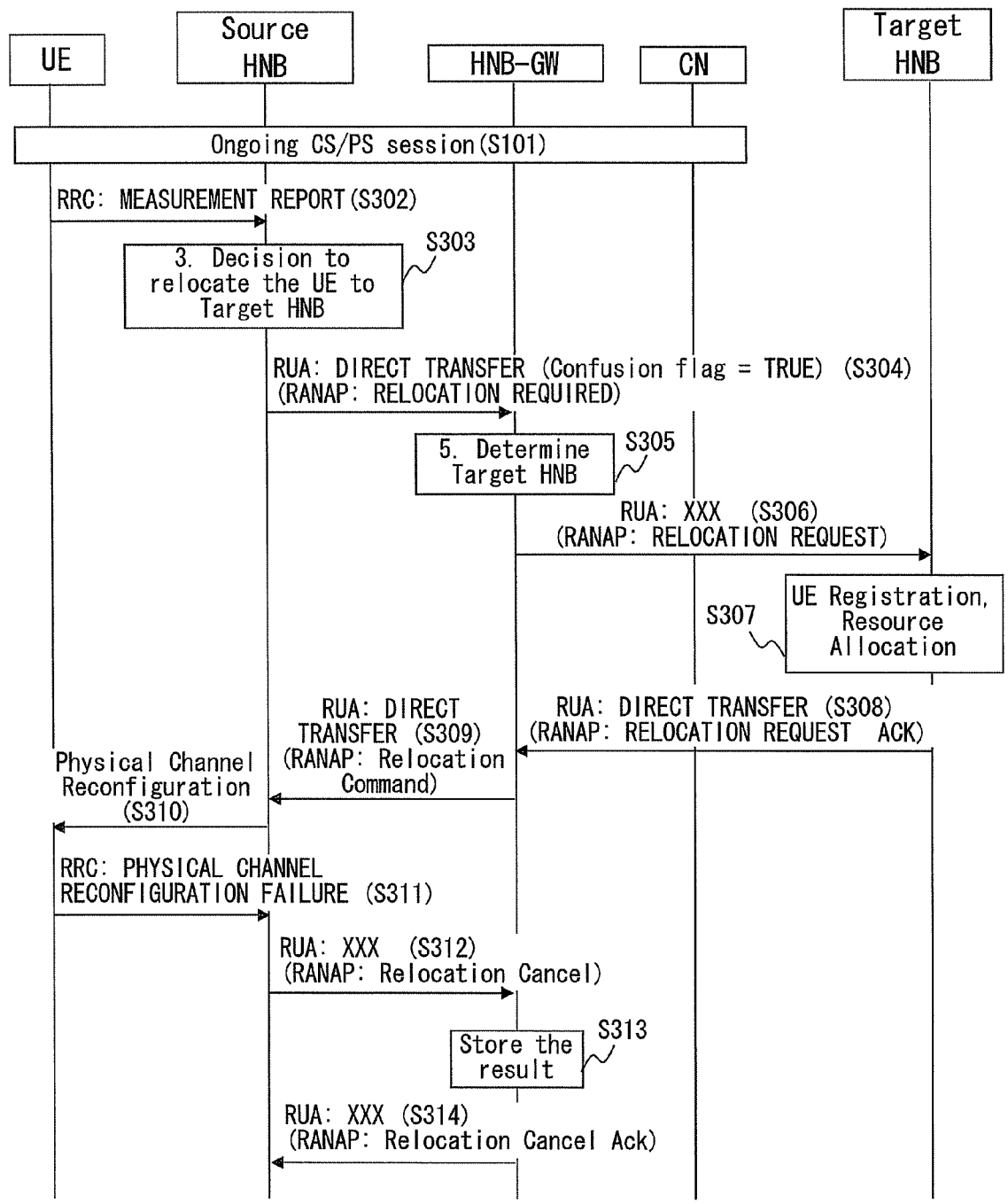
FIG. 8 is a sequence diagram showing an operation of the mobile communication system at the time of executing handover according to the first exemplary embodiment.

Next, the operation of the mobile communication system when there is a need to execute the handover that is generated by move of the UE 120 is explained. FIG. 8 is a sequence diagram showing the operation of the mobile communication system at the time of executing the handover. That is, FIG. 8 shows the process when the UE 120 transmits an RRC:MEASUREMENT REPORT message in order for the UE 120 to handover to the HNB # b101 by the UE 120 moving to be close to the HNB # b101 while communicating with the HNB # a100. Further, in FIG. 8, the HNB-GW110 shall hold the table in the database shown in FIG. 5.

The UE 120 is in the state of communication with CS (Circuit Switch) or PS (Packet Switch) (S101). The UE 120 transmits the RRC:MEASUREMENT REPORT message including the information on the PSC of the HNB # b101 (PSC=2) to the HNB # a100, which is the Source HNB, in order to hand over to the HNB # b101 (S302). When measurement of the frequency is instructed, the UE 120 includes in the RRC:MEASUREMENT REPORT message whether or not the frequency being measured and the base station (HNB # a100) where the UE 120 exists is the same, and notifies the RRC:MEASUREMENT REPORT message.

The Source HNB (HNB # a100) which received the RRC:MEASUREMENT REPORT message is a cell including PSC=2, and selects the cell that satisfies the condition of frequency from the information on the neighbor cells of the Source HNB (FIG. 4). That is, when the frequency of the base station notified by the UE 120 in the RRC:MEASUREMENT REPORT message is the same as the frequency of the Source HNB, the Source HNB selects the base station including the frequency. On the other hand, when the frequency of the base station notified by the UE 120 in the RRC:MEASUREMENT REPORT message is different from the frequency of the Source HNB, the Source HNB selects the base station with the frequency different from the frequency used by the Source HNB. However, both the HNB # b101 cell and the HNB # d103 cell have PSC=2 here. Moreover, all of HNB # a, HNB # b, and HNB # d are using the same frequency ("X"). That is, the PSC Confusion is generated. Therefore, the Source HNB (HNB # a100) selects any one cell (the cell corresponding to the RNC-ID) at random. Here, RNC-ID=DD shall be selected. Specifically, the Source HNB (HNB # a100) selects the HNB # d103 as the handover destination of the UE 120 (S303).

The Source HNB (HNB # a100) transmits the RUA:DIRECT TRANSFER message including RNC-ID=DD selected in S303 to the HNB-GW110 (S304). Since the PSC Confusion is generated here, the Source HNB (HNB # a100) sets the Confusion flag in the RUA:DIRECT TRANSFER message to "TRUE", and transmits the RUA:DIRECT TRANSFER message.

As the Confusion flag in the RUA:DIRECT TRANSFER message is set to "TRUE", the HNB-GW110 which received the RUA:DIRECT TRANSFER message can recognize that the Source HNB (HNB # a100) selected the Target HNB at random. The database storing handover history, which is described later, does not exist inside the HNB-GW110 here. The database does not exist before the handover is performed via the HNB-GW110. When the database does not exist, the HNB-GW110 does not handle the PSC Confusion. That is, the HNB-GW110 identifies the HNB # d103 as the Target HNB without handling the PSC Confusion (S305). The HNB-GW110 generates the RANAP:RELOCATION REQUEST message to be transmitted to the HNB # d103 including the transmitted RNC-ID.

The HNB-GW110 transmits the RANAP:RELOCATION REQUEST message encapsulated in the RUA message to the HNB # d103, which is the identified Target HNB (S306).

When the Target HNB receives the RANAP:RELOCATION REQUEST message, the Target HNB registers the information on the UE 120 that performs handover and reserves the resource for the UE 120 (S307). Then, the Target HNB transmits the RUA:DIRECT TRANSFER message encapsulating a RANAP:RELOCATION REQUEST ACKNOWLEDGE message to the HNB-GW110 (S308).

The HNB-GW110 which received the RUA:DIRECT TRANSFER message transmits a RANAP:RELOCATION COMMAND message to the Source HNB (HNB # a100) (S309). The Source HNB (HNB # a100) which received the RANAP:RELOCATION COMMAND message transmits Physical Channel Reconfiguration for instructing physical channel reconfiguration to the UE 120 (S310).

The UE 120 which received the Physical Channel Reconfiguration attempts to obtain wireless synchronization with the HNB # b101, which is the desired handover destination. However, in S306, the HNB-GW110 transmits the RUA message (RUA:XXX) encapsulating the RANAP:RELOCATION REQUEST message to the HNB # d103. Therefore, the HNB # b101 does not register the information on the UE 120 that performs handover, and the like. Accordingly, the UE 120 fails the wireless synchronization with the HNB # b101. The UE 120 transmits an RRC:PHYSICAL CHANNEL RECONFIGURATION FAILURE message to the Source HNB (HNB # a100) (S311).

The Source HNB (HNB # a100) which received the RRC:PHYSICAL CHANNEL RECONFIGURATION FAILURE message transmits the RUA:XXX message encapsulating a RANAP:RELOCATION CANCEL message to the HNB-GW110 (S312).

The HNB-GW110 recognizes that the handover failed by not receiving a RANAP:RELOCATION DETECT message from the Target HNB, and further, receives the RANAP:RELOCATION CANCEL message from the Source HNB (HNB # a100). The HNB-GW110 creates a new database when there is no inside database that stores the history of handover results. Then, the HNB-GW110 reflects the handover failure on the table (FIG. 9) in the database (S313). Note that the HNB-GW110 may create the database in the initialized state at the time of operation.

FIG. 9 is the table in the database that stores the history of handover results inside the HNB-GW110. As shown in FIG. 9, the table stores the information of whether or not the handover to the HNB, which is the target of the handover destination, from the HNB of each handover source is successful or not. In the abovementioned S313, as the handover from the HNB # a100 to the HNB # d103 has failed, the result of the failure is reflected on the table.

Note that although the table shown in FIG. 9 is configured to store the number of handover successes and failures, it is not limited to this. For example, the table may be configured to store only the number of handover failures or successes.

After reflecting the success or failure of handover on the database, the HNB-GW110 transmits the RUA:XXX message encapsulating the RANAP:RELOCATION CANCEL ACKNOWLEDGE message to the Source HNB (S314). By the above process, the mobile communication system according to this exemplary embodiment completes the handover process.

Figure 10:
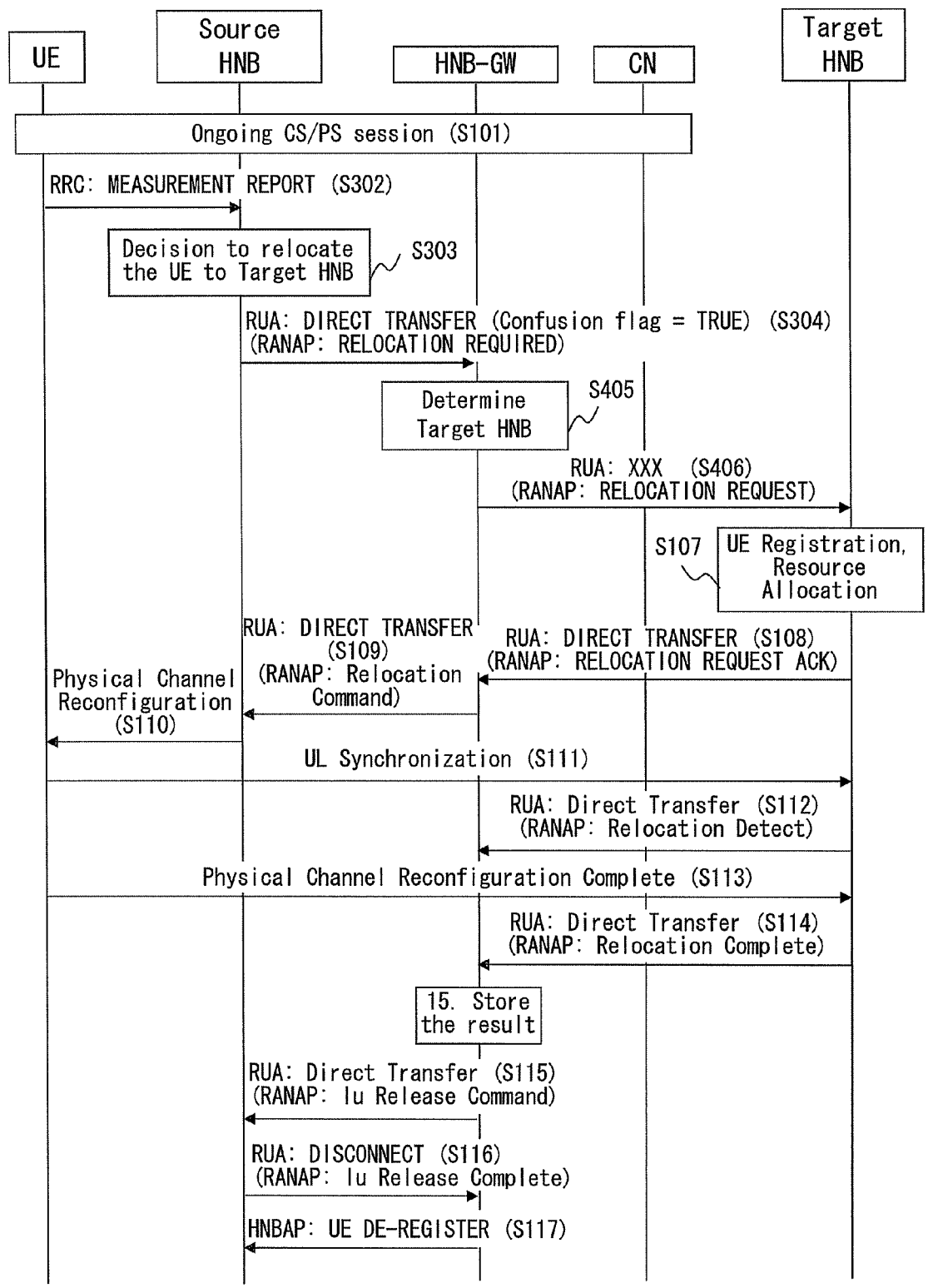
FIG. 10 is a sequence diagram showing an operation of the mobile communication system at the time of executing handover according to the first exemplary embodiment.

Next, in the state of the table shown in FIG. 9, the process of the case when the UE 120 further requests handover from the HNB # a100 to the HNB # b101 is explained. FIG. 10 is a sequence diagram showing a flow of the process.

The process of S101 and S302 to S304 is the same as the process shown in FIG. 9. The HNB-GW110 which received the RUA:DIRECT TRANSFER message can recognize that the Source HNB (HNB # a100) selected the Target HNB at random as the Confusion flag in the RUA:DIRECT TRANSFER message is set to "TRUE".

Then, the HNB-GW110 refers to the table (FIG. 9) in the database showing the handover history, and selects an appropriate HNB as the handover destination from the HNBs with the transmitted PSC. Specifically, the HNB-GW110 ranks the Target HNBs (the HNBs with the transmitted PSC) as described below.

First, a row f the HNB, which is the handover source, is extracted from the table (FIG. 9) in the database showing the handover history. A row of the HNB # a is extracted here. Next, the table holding the PSC information on each HNB shown in FIG. 5 is referred, the HNB with the same PSC as the transmitted PSC is identified, and other HNBs are excluded. Further, the HNB-GW110 refers to the table shown in FIG. 5 and excludes the HNBs not using the same UARFCN as the Target RNC-ID from the candidates. This is for not generating the PSC Confusion even when the same PSC is used with different frequencies.

Then, the HNB with a low failure rate in the handover is highly ranked among the remaining HNBs. Although HNB # b and HNB # d have the same PSC, HNB # b with the low failure rate is highly ranked. Such a series of processes creates a list of ranked handover destination candidates as shown in FIG. 11. Then, the HNB-GW110 selects the highest ranked HNB # b as the handover destination (Target HNB) (S405).

Although in the above explanation, the list of handover destination candidates ranked as shown in FIG. 11 is generated according to the handover history, it is not limited to this and the HNBs may be ranked by other methods. For example, the HNB-GW110 can notify the position information thereof by an HNBAP:HNB LOCATION INFORMATION message from each HNB. When the PSC Confusion is generated, the HNB-GW110 uses this position information to preferentially select the HNB close to the Source HNB. Selection of the HNB using this position information increases the possibility of executing handover to the Target HNB intended by the UE 120.

Figure 20:
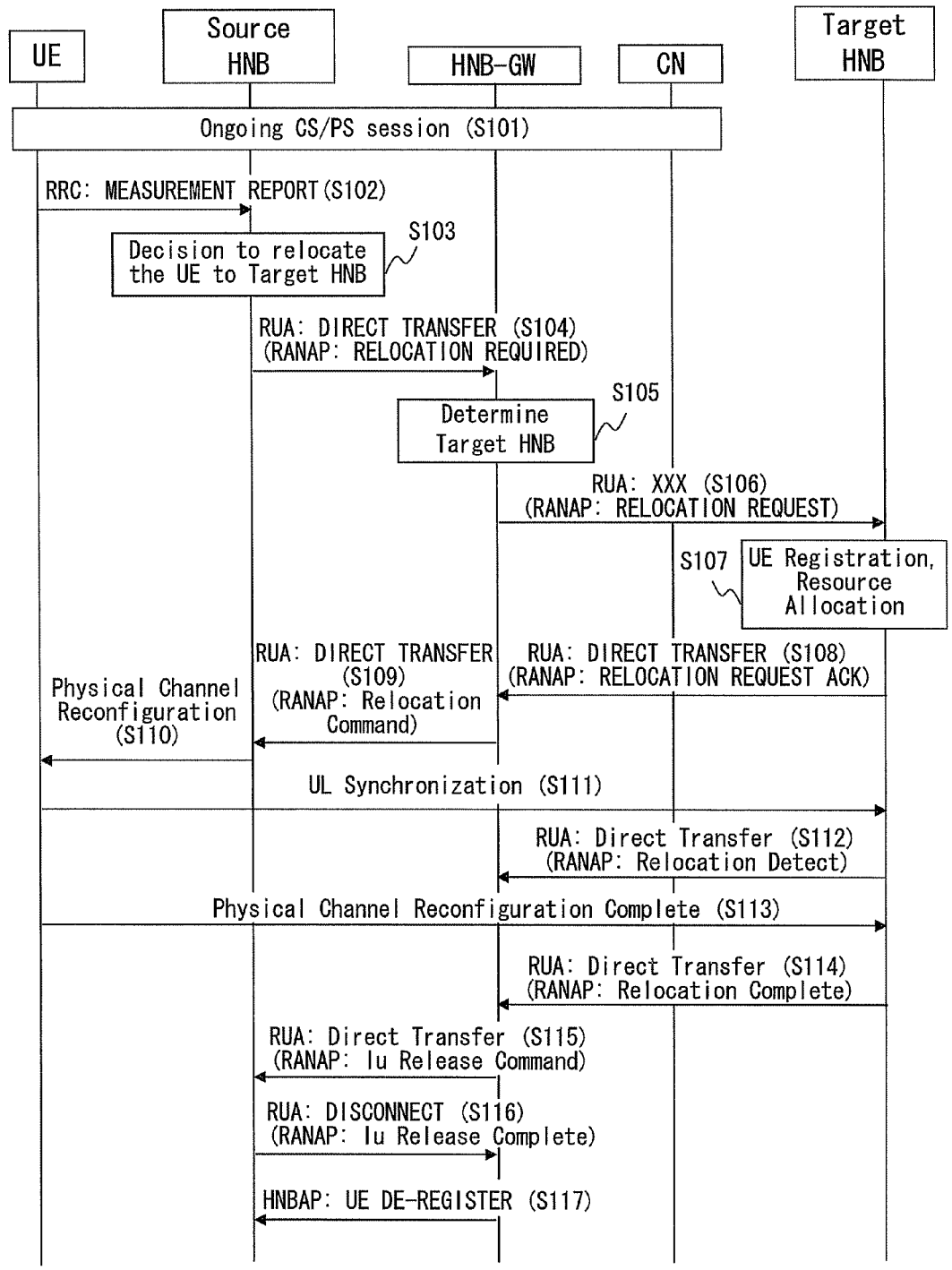
FIG. 20 is a view showing an operation of a mobile communication system at the time of executing handover according to a related art.

The HNB-GW110 transmits the RUA:XXX message encapsulating the RANAP:RELOCATION REQUEST message to the HNB # b101 that is selected as the Target HNB (S406). Subsequent process (from S107 to S114) is the same as the process shown in FIG. 20.

By receiving the RUA:DIRECT TRANSFER message encapsulating a RANAP:RELOCATION COMPLETE message from the Target HNB, the HNB-GW110 can recognize that the handover is normally completed. The HNB-GW110 reflects that the handover is successful on the table (FIG. 9) that stores the handover history (S415). The subsequent process (S115 to S117) is the same as the process shown in FIG. 3.

Figure 12:
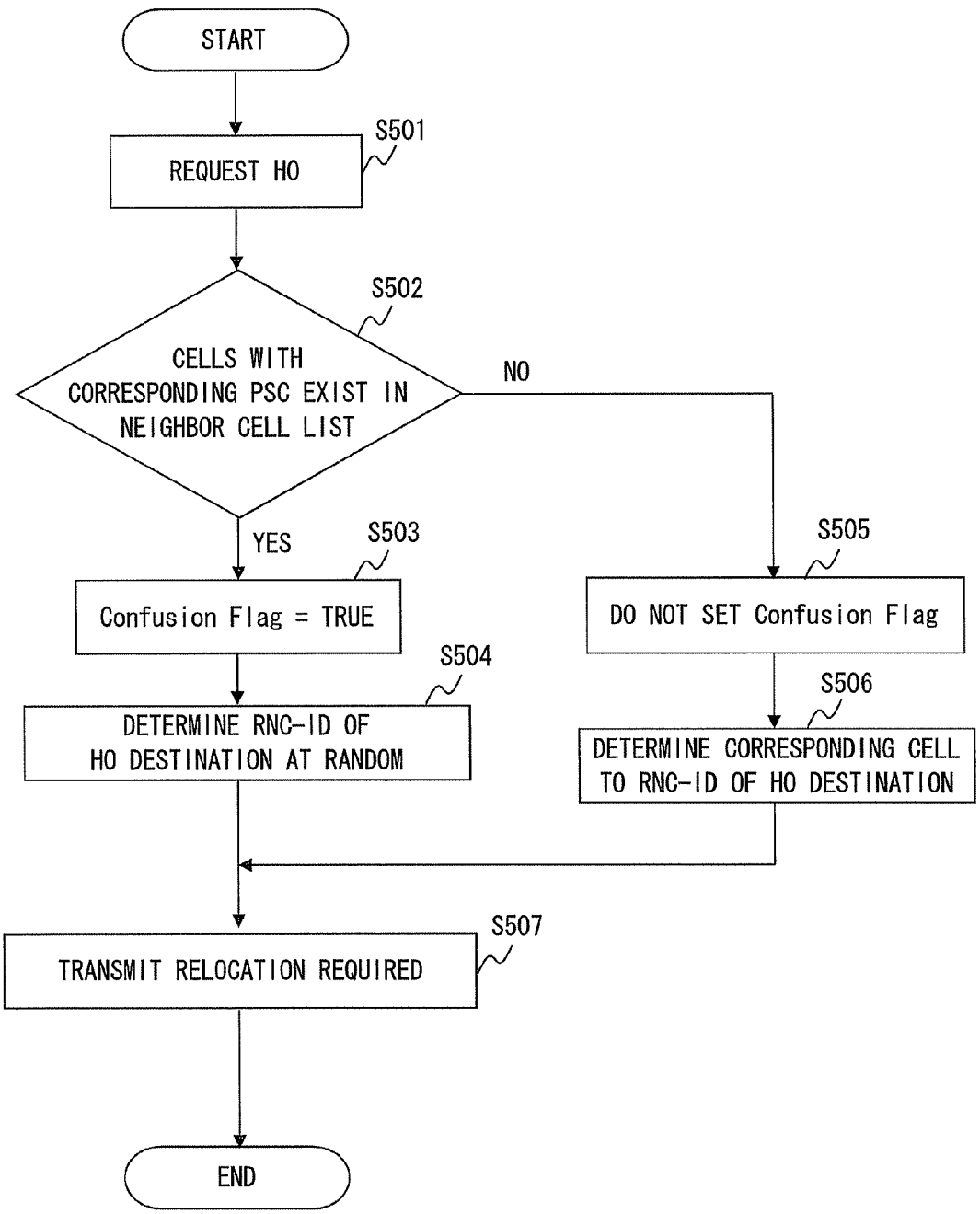
FIG. 12 is a flowchart showing a process when a Source HNB determines a Target HNB according to the first exemplary embodiment.

Next, the process leading to determination of the Target HNB by the Source HNB according to this exemplary embodiment is explained using the flowchart of FIG. 12. Firstly, the HNB receives a handover request from the UE 120 (S501). The Source HNB searches for a cell with the PSC included in the received handover request from a neighbor list (FIG. 3). When a plurality of cells are detected here (S502: Yes), that is, when the PSC Confusion is generated, the Confusion flag of the RUA:DIRECT TRANSFER message is set to "True" (S503). Then, the Source HNB determines the RNC-ID of the handover destination at random from the HNBs with the received PSC (S504).

On the other hand, when there is no plurality of cells with the PSC included in the received handover request in the neighbor list (FIG. 3) (S502: No), the Source HNB does not set the Confusion flag of the RUA:DIRECT TRANSFER message (S505). Accordingly, the Confusion flag is "False". After that, the Source HNB selects the RNC-ID according to the handover request from the UE 120 (S506).

The Source HNB transmits the RUA(RANAP User Adaption):DIRECT TRANSFER message including the selected RNC-ID to the HNB-GW110 (S507). The RANAP(Radio Access Network Application Part):RELOCATION REQUIRED message is encapsulated in the RUA:DIRECT TRANSFER message.

Figure 13:
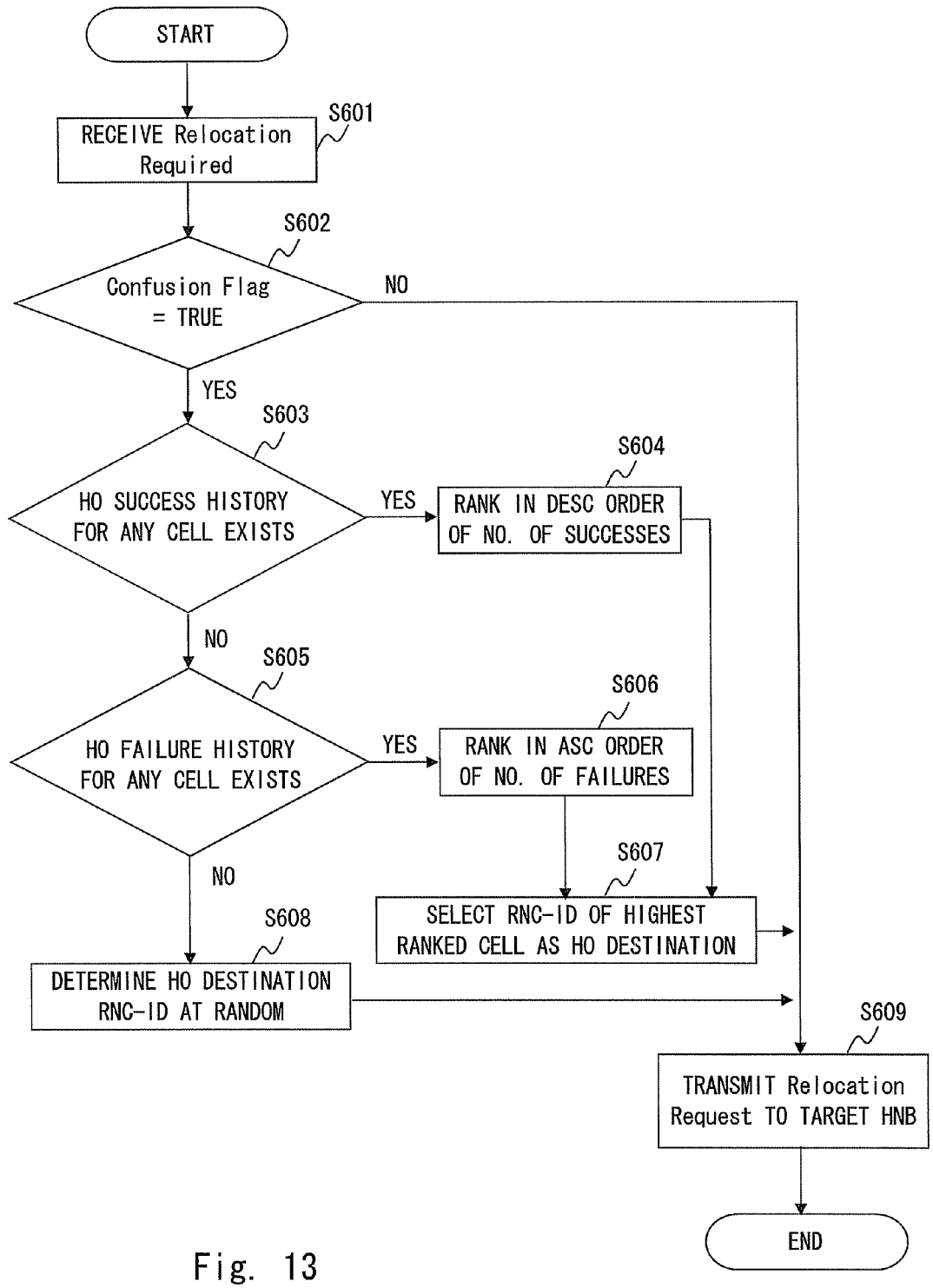
FIG. 13 is a flowchart showing a process when HNB-GW110 determines the Target HNB according to the first exemplary embodiment.

Next, the process leading to the determination of the Target HNB by the HNB-GW 110 according to this exemplary embodiment is explained using the flowchart of FIG. 13. The HNB-GW110 receives the RUA:DIRECT TRANSFER message encapsulating the RANAP:RELOCATION REQUIRED message from the Source HNB (S601). When the Confusion flag of the RANAP:RELOCATION REQUIRED message is set to "FALSE" (S602: No), the HNB-GW110 transmits the RUA:XXX message encapsulating the RANAP:RELOCATION REQUEST message to the Target HNB according to the transmitted RNC-ID (S609).

When the Confusion flag of the RANAP:RELOCATION REQUIRED message is set to "TRUE" (S602: Yes), that is, when the PSC Confusion is generated, the HNB-GW110 refers to the table (FIG. 9) in the database showing the handover history. The HNB-GW110 refers to the table and evaluates whether or not there is success history of the handover among the plurality of HNBs with the received PSC (S603). When there is the success history (S603: Yes), the HNB-GW110 ranks the HNBs in the descending order of number of successes (S604). When there is no success history (S603: Yes), it is evaluated whether or not there is any failure history of the handover among the plurality of HNBs with the received PSC (S605). When there is the failure history (S605:

Yes), the HNB-GW110 ranks the HNBs in the ascending order of number of failures (S606).

When the HNB-GW110 ranks the plurality of HNBs with the same PSC as the received PSC, the RNC-ID of the highest ranked cell is selected as the handover destination (S607). On the other hand, even when the Confusion flag is set to "TRUE" (S602: Yes), in the case when there is no success history and failure history in the table in the database showing the handover history (S603: No and S605: No), the handover destination is selected at random (S608). At this time, as mentioned above, the frequency information is referred and the handover destination selected at random can be limited. After that, the HNB-GW110 transmits the RUA:XXX message encapsulating the RANAP:RELOCATION REQUEST message to the Target HNB according to the selected RNC-ID (S609).

Note that in the abovementioned explanation, although the HNB-GW110 is explained as a processing apparatus that selects a connection destination of the mobile station according to the connection history information, it is not limited to this and other apparatuses connected to the HNB-GW110 may function as the processing apparatus, for example.

Next, an effect of the mobile communication system according to this exemplary embodiment is explained. The HNB according to this exemplary embodiment transmits to the HNB-GW110 the PSC and the frequency (UARFCN) assigned to the HNB. Accordingly, the HNB-GW110 can recognize the PSC and the frequency of each HNB.

Moreover, as described above, the Confusion flag, which is the new parameter, is added to the RUA:DIRECT TRANSFER message transmitted from the Source HNB to the HNB-GW110. When the PSC Confusion is generated, specifying this parameter enables the Source HNB to notify to that effect to the HNB-GW110.

The HNB-GW110 includes inside a table in a database that stores execution history of the handover (whether or not the handover succeeded). Referring to the table enables an HNB-GW110 to select the HNB with high success rate of handover as the Target HNB even when the PSC Confusion is generated.

Second Exemplary Embodiment

The second exemplary embodiment of the present invention is characterized in that the Source HNB specifies a plurality of RNC-IDs. Hereinafter differences from the first exemplary embodiment are focused and explained.

FIGS. 14A and 14B describe the Target ID included in the RANAP:RELOCATION REQUIRED message transmitted from the Source HNB to the HNB-GW110. It is configured in a way that the plurality of RCN-IDs can be specified as compared to the configuration of the Target ID of the related art. That is, the Source HNB defines a Target RNC-ID LIST as a new information element (IE) to the Target ID, can specify the plurality of RNC-IDs to the Target RNC-ID LIST, and transmit them to the HNB-GW110. In the definition shown in FIG. 14, up to 16 RNC-IDs can be specified. Note that for details of the RANAP:RELOCATION REQUIRED and the Target ID, see the 3GPP Release 8 TS 25.413.

In this exemplary embodiment, in S304 of the process flow of the handover shown in FIG. 10, when the PSC Confusion is generated, the Source HNB does not specify the Confusion flag and specifies all the RNC-IDs for the cells with the same PSC. The Source HNB transmits the RANAP:RELOCATION REQUIRED message including the Target ID which specified the plurality of RNC-IDs to the HNB-GW110.

When the plurality of RNC-IDs are specified, the HNB-GW110 which received the RANAP:RELOCATION REQUIRED message evaluates that the PSC confusion is generated. Other processes are the same as that of the first exemplary embodiment.

Next, an effect of the mobile communication system according to this exemplary embodiment is explained. As described above, the Source HNB can transmit the RANAP:RELOCATION REQUIRED message including the Target ID which specified the plurality of RCN-IDs to the HNB-GW110. Then, the HNB-GW110 can select the handover destination from the cells concerning the received RCN-ID without searching in the table (FIG. 5) managed by the HNB-GW110.

Further, the above configuration enables the Source HNB to notify that the PSC Confusion is generated without specifying the Confusion flag.

Third Exemplary Embodiment

A third exemplary embodiment of the present invention is characterized in that each HNB holds execution history of handover instead of the HNB-GW110. Differences from the first exemplary embodiment and the second exemplary embodiment are focused and explained.

Figure 15:
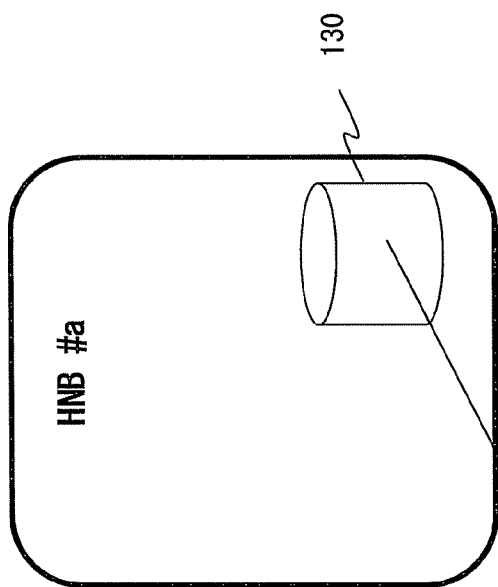
FIG. 15 is a view showing a configuration of HNB according to a third exemplary embodiment.

FIG. 15 is view showing a configuration of the HNB according to this exemplary embodiment. As illustrated, each HNB includes a database 130 inside, and a table is held inside the database 130. In addition to the PSC, RNC-ID, and UARFCN, each HNB stores the number of handover successes and the number of handover failures as a neighbor list. The number of handover successes indicates the number of handover successes from the HNB that holds the table. Further, the number of handover failures indicates the number of handover failures from the HNB that holds the table. Note that in this exemplary embodiment, the HNB-GW 110 does not hold the database (FIG. 9) concerning the handover history.

Each HNB holds only the information on the base station which composes its own cell and the neighbor cells to its own database. Therefore, the size of the table that stores the handover history is smaller than the first exemplary embodiment and the second exemplary embodiment.

Figure 16:
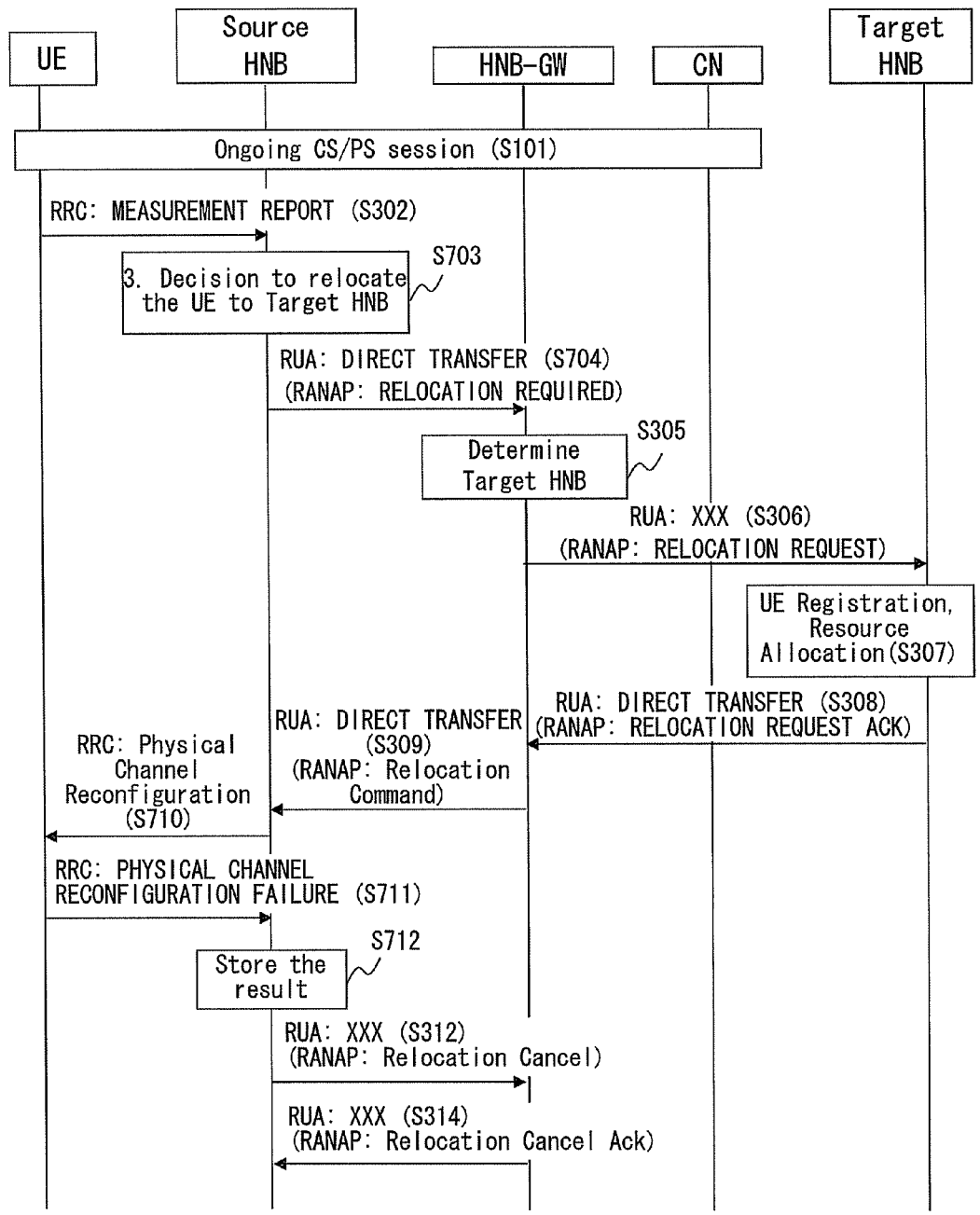
FIG. 16 is a sequence diagram showing an operation of a mobile communication system at the time of executing handover according to the third exemplary embodiment.

The process of the mobile communication system according to this exemplary embodiment in the case when the UE 120 communicating using the HNB # a100 issues a handover request to the HNB # b100 is explained using FIG. 16. Note that FIG. 16 shows an example of the handover failure caused by the PSC Confusion in a similar manner as FIG. 8.

The process of S101 and S302 is the same as the process shown in FIG. 8. The Source HNB (HNB # a100) refers to the PSC included in the received RRC:MEASUREMENT REPORT message and evaluates the RNC-ID of the handover destination (S703). The value of the received PSC is "2" here and there are a plurality of rows with PSC="2" in the table in the database inside the HNB # a100. All the neighbor base stations are using the same frequency ("X"). Therefore, the Source HNB evaluates that the PSC Confusion is generated.

When it is evaluated that the PSC Confusion is generated, the Source HNB refers to the table in the database that stores the handover history. Then, the Source HNB compares the number of handover successes and failures for the cells with the received PSC, and ranks them. When the table inside the Source HNB (HNB # a100) shown in FIG. 15 is referred here, both the number of handover successes and the number of handover failures for the HNB # b101 and the HNB # d103 are zero. Therefore, the Source HNB (HNB # a100) selects the handover destination at random from the HNB # b101 and the HNB # d103. In the following example, the Source HNB (HNB # a100) examines the case of selecting the HNB # d103.

The Source HNB transmits to the HNB-GW110 the RUA: DIRECT TRANSFER message encapsulating the RANAP: RELOCATION REQUIRED message including the RNC-ID ("DD") of the selected HNB # d103 (S704). The subsequent process of S305 to S309 is the same as the process shown in FIG. 8.

The Source HNB which received the RANAP:RELOCATION COMMAND message from the HNB-GW110 transmits RRC:Physical Channel Reconfiguration to the UE 120 (S710). When the Source HNB receives the RRC:PHYSICAL CHANNEL RECONFIGURATION FAILURE message from the UE 120 after transmitting the RRC:Physical Channel Reconfiguration (S711), the Source HNB evaluates that the handover failed.

When the handover failed, the Source HNB updates the failure on the table in its own the database (S712). The table of the HNB # a100, which is the updated Source HNB, is shown in FIG. 17.

Figure 18:
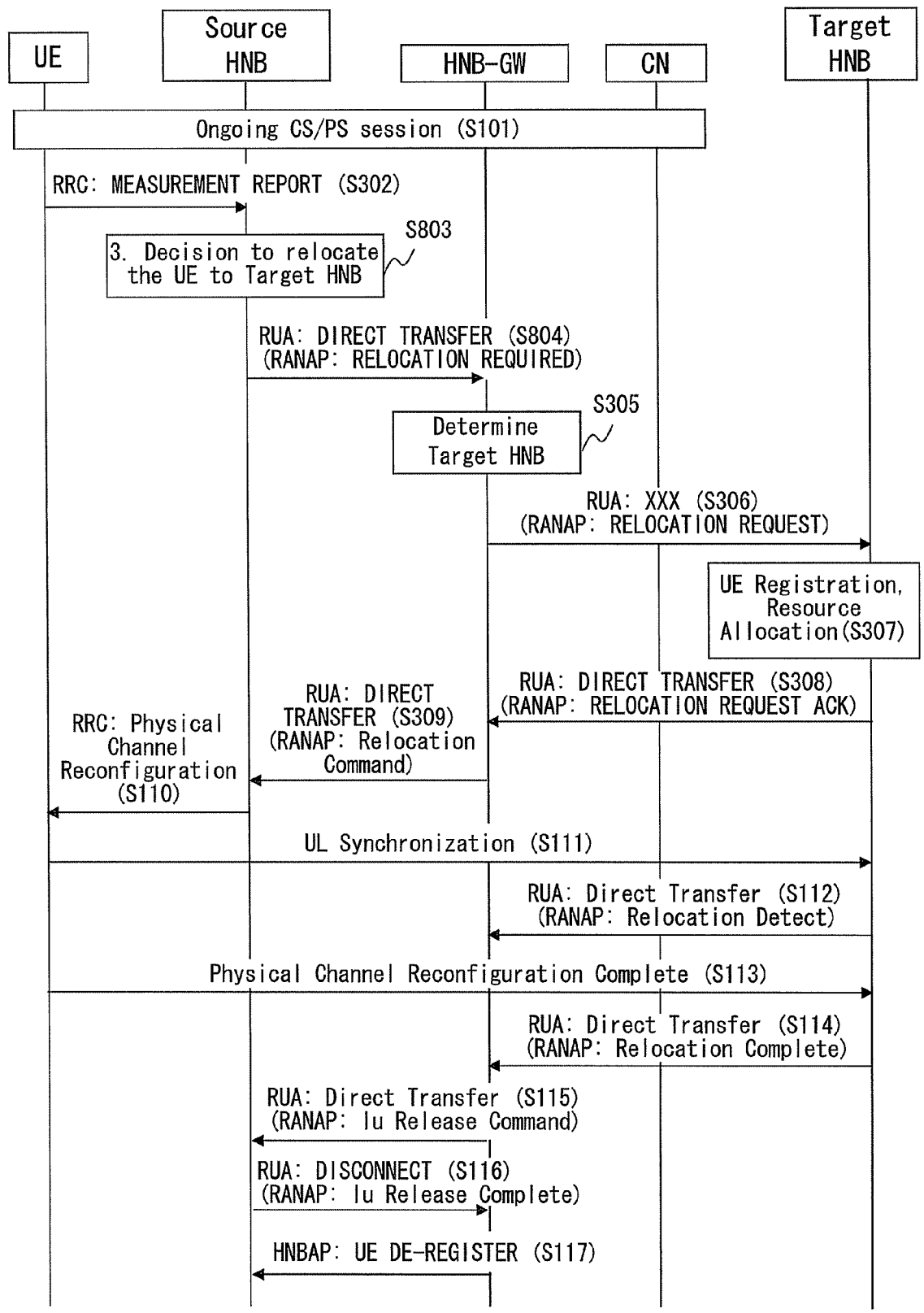
FIG. 18 is a sequence diagram showing an operation of the mobile communication system at the time of executing handover according to the third exemplary embodiment.

Next, the process of the mobile communication system according to this exemplary embodiment for the case when the UE 120 which is communicating using the HNB # a100 issues a handover request to the HNB # B101 is explained using FIG. 18.

The process of S101 and S302 is the same as the process shown in FIG. 16. After that, the Source HNB (HNB # a100) refers to the PSC included in the received RRC:MEASUREMENT REPORT message and evaluates the RNC-ID of the HNB, which is the handover destination (S803). In a similar manner as FIG. 16, the Source HNB (HNB # a100) evaluates that the PSC Confusion is generated.

When it is evaluated that the PSC Confusion is generated, the Source HNB refers to the table in the database that stores the handover history and selects the handover destination. Both the number of handover successes and the number of handover failures for the HNB # b101 are zero. On the other hand, the number of handover failures for the HNB # d103 is one. Therefore, the Source HNB selects the HNB # b101 as the handover destination. The Source HNB transmits to the HNB-GW110 the RUA:DIRECT TRANSFER message encapsulating the RANAP:RELOCATION REQUIRED message including RNC-ID ("BB") of the selected HNB # b101 (S804). The subsequent process in S305 to S309 is the same as the process shown in FIG. 8. The process in S110 to S117 is the same as the process shown in FIG. 20.

When a RANAP:IU RELEASE COMMAND message and a HNBAP:UE DE-REGISTER are received from the HNB-GW110 after the RANAP RELOCATION COMMAND is transmitted, the Source HNB evaluates that the handover succeeded. When the handover succeeded, the Source HNB updates the success on the table in its own database.

Figure 19:
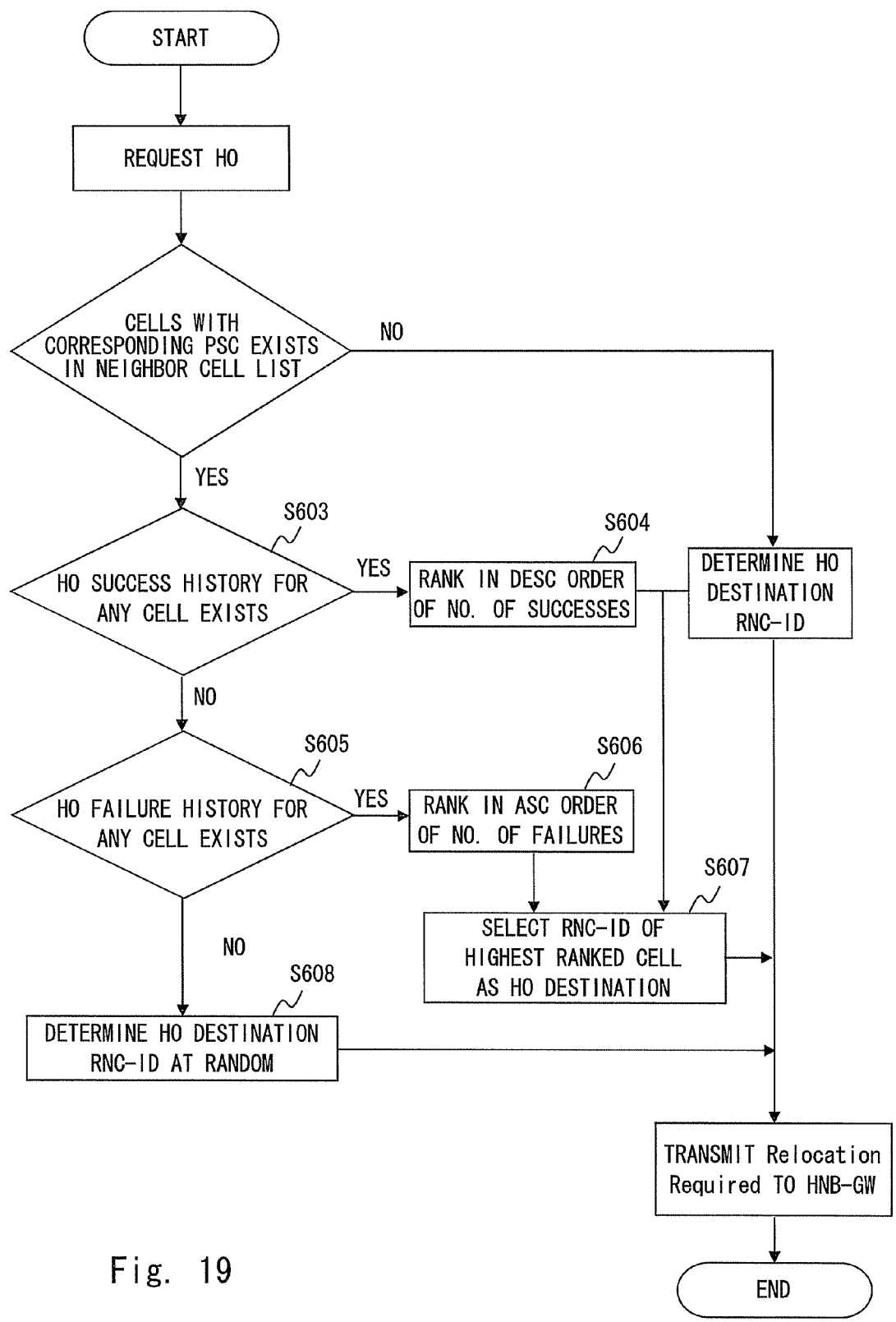
FIG. 19 is a flowchart showing a process when a Source HNB determines a Target HNB according to the third exemplary embodiment.

Next, FIG. 19 is shown for the process at the time when the Source HNB determines the Target HNB according to this exemplary embodiment. In a similar manner as FIG. 13, the handover destination is determined according to the handover history (S603 to S608).

Next, an effect of the mobile communication system according to this exemplary embodiment is explained. As described above, in this exemplary embodiment, the Source HNB holds history of handover successes and failures to the HNBs composing the neighbor cells of the Source HNB. The Source HNB determines the handover destination of the UE 120 according to the history. As the Source HNB holds only the history regarding the HNBs that compose the neighbor cells, the amount of information is less than the history information held by the HNB-GW110. Therefore, there is a lower possibility that the same PSC is assigned to the HNBs held by the Source HNB. Even when the PSC Confusion is generated, the number of base stations to be handover candidates is reduced and the failure rate of the handover will be even lower.

Note that the present invention is not limited to the above exemplary embodiments, but can be modified as appropriate without departing from the scope. For example, although an example of using the Intra CGS and also the Intra HNB-GW for the mobile communication system is described in the first and second exemplary embodiment, it is not limited to this and it can be applied to the environment using the Inter CSG and the Intra HNB-GW. In the case of the environment using the Inter CSG and the Intra HNB-GW, the CN will perform the process equivalent to a part of the abovementioned handover process. Even in the environment using the Inter CGS and the Intra HNB-GW, a success or a failure of the handover is evaluated according to whether the HNB-GW receives the RANAP:RELOCATION CANCEL message or the RANAP: RELOCATION COMPLETE message, and updates the database.

Further, although an example of using the Intra CGS and also the Intra HNB-GW for the mobile communication system is described in the third exemplary embodiment is explained, it is not limited to this and it can be applied to the environment using the Inter CSG and the Intra HNB-GW. In the case of the environment using the Inter CSG and the Intra HNB-GW, a success or a failure of the handover is evaluated according to whether the Source HNB receives the RRC: PHYSICAL CHANNEL RECONFIGURATION FAILURE message or the RANAP: IU RELEASE COMMAND message, and updates the database.

Note that the abovementioned process for determining the handover destination can be realized by causing a CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

A processing apparatus that, when a connection of a mobile station is switched from a first base station to a second base station, selects the second base station from a plurality of base stations according to connection history information indicating a success or a failure of past switching of the connection from the first base station to at least one of the plurality of base stations.

(Supplementary Note 2)

The processing apparatus according to Supplementary note 1, wherein the processing apparatus selects the second base station using the connection history information from the base station assigned with a spreading code that is same as the spreading code of the base station transmitted by the mobile station for notifying the base station that satisfies a condition to switch the connection among the plurality of base stations.

(Supplementary Note 3)

The processing apparatus according to Supplementary note 1 or 2, wherein the processing apparatus preferentially selects the base station with a relatively high success rate of the connection as the second base station in the connection history information.

(Supplementary Note 4)

The processing apparatus according to one of Supplementary notes 1 to 3, wherein when the mobile station notifies information on a frequency of the base station that satisfies the condition to switch the connection, the processing apparatus selects the second base station from the base stations that use the same frequency as the frequency among the plurality of base stations.

(Supplementary Note 5)

A mobile communication system comprising:

a first base station that generates a first cell and can be connected to a mobile station;

a gateway apparatus that communicatively connects the first base station and a plurality of base stations to a higher-level network; and a processing means that, when a connection of the mobile station is switched from the first base station to a second base station that is included in the plurality of base stations, selects the second base station from the plurality of base stations according to connection history information indicating a success or a failure of past switching of the connection from the first base station to at least one of the plurality of base stations.

(Supplementary Note 6)

The mobile communication system according to Supplementary note 5, wherein the processing means selects the second base station using the connection history information from the base station assigned with a spreading code that is same as the spreading code of the base station transmitted by the mobile station for notifying the base station that satisfies a condition to switch the connection.

(Supplementary Note 7)

The mobile communication system according to Supplementary note 5 or 6, wherein the processing means preferentially selects the base station with a relatively high success rate of the connection as the second base station in the connection history information.

(Supplementary Note 8)

The mobile communication system according to one of Supplementary notes 5 to 7, wherein when the mobile station notifies information on a frequency of the base station that satisfies the condition to switch the connection, the processing means selects the base station to which the mobile station is connected from the base stations that use the same frequency as the frequency among the plurality of base stations.

(Supplementary Note 9)

The mobile communication system according to one of Supplementary notes 5 to 8, wherein the first base station notifies the processing unit of a flag indicating whether or not the plurality of base stations exist that are assigned with the same spreading code as the spreading code of the base station transmitted by the mobile station to notify the base station that satisfies the condition for switching the connection, and when receiving the flag, the processing means selects the second base station according to the connection history information.

(Supplementary Note 10)

The mobile communication system according to one of Supplementary notes 5 to 8, wherein when the plurality of base stations exist that are assigned with the same spreading code as the spreading code of the base station transmitted by the mobile station for notifying the base station that satisfies the condition to switch the connection, the first base station notifies the processing means of all of the plurality of base station candidates, and the processing means selects the second base station according to the connection history information from the plurality of base station candidates notified from the first base station.

(Supplementary Note 11)

The mobile communication system according to one of Supplementary notes 5 to 10, wherein the processing means is disposed in the gateway apparatus.

(Supplementary Note 12)

The mobile communication system according to one of Supplementary notes 5 to 8, wherein the processing means is disposed in the first base station, and when the plurality of base stations exist with the same spreading code as the spreading code of the base station transmitted by the mobile station for notifying the base station that satisfies the condition to switch the connection, the first base station selects the second base station according to the connection history information from the plurality of base stations with the same spreading code.

The present application claims priority rights of and is based on Japanese Patent Application No. 2009-286823 filed on Dec. 17, 2009 in the Japanese Patent Office, the entire contents of which are hereby incorporated by reference.

REFERENCE SIGNS LIST

| | |
|---|---|
| 10 | BASE STATION A |
| 20 | BASE STATION B |
| 30 | BASE STATION C |
| 40 | BASE STATION D |
| 50 | GATEWAY APPARATUS |
| 60 | MOBILE STATION |
| 100 | HNB#a |
| 101 | HNB#b |
| 102 | HNB#c |
| 103 | HNB#d |
| 110 | HNB-GW |
| 120 | UE |

The invention claimed is:

1. A base station apparatus that, when receiving a measurement report from a mobile station in connection to a desired base station apparatus, transmits-information of whether or not a same spreading code is assigned to the desired base station apparatus and another base station apparatus, to a processing apparatus that, when a connection of a mobile station is switched from a first base station to a second base station, selects the second base station from a plurality of base stations according to connection history information indicating a success or a failure of past switching of the connection from the first base station to at least one of the plurality of base stations, wherein the processing apparatus selects the second base station using the connection history information from the base station assigned with a spreading code that is same as the spreading code of the base station transmitted by the mobile station for notifying the base station that satisfies a condition to switch the connection among the plurality of base stations.

2. A base station apparatus that transmits a spreading code and frequency information that is used by the base station apparatus to a processing apparatus that, when a connection of a mobile station is switched from a first base station to a second base station, selects the second base station from a plurality of base stations according to connection history information indicating a success or a failure of past switching of the connection from the first base station to at least one of the plurality of base stations, wherein the processing apparatus selects the second base station using the connection history information from the base station assigned with a spreading code that is same as the spreading code of the base station transmitted by the mobile station for notifying the base station that satisfies a condition to switch the connection among the plurality of base stations.

3. The base station apparatus according to claim 1, wherein the base station apparatus incorporates the information of whether or not the same spreading code is assigned into RUA:DIRECT TRANSFER and transmits the RUA:DIRECT TRANSFER including that information.

4. The base station apparatus according to claim 1, wherein the base station apparatus compares spreading code information received from the mobile station with a list of neighbor base stations held by the base station apparatus, and thereby determines whether or not the same spreading code is assigned to the desired base station apparatus and the another base station apparatus.

5. The base station apparatus according to claim 2, wherein the base station apparatus incorporates the spread code and the frequency information into a HNB REGISTER REQUEST message and transmits the HNB REGISTER REQUEST message including the spread code and the frequency information.

6. A mobile communication system comprising:
 a first base station that generates a first cell and can be connected to a mobile station; and
 a gateway apparatus that communicatively connects the first base station and a plurality of base stations to a higher-level network;
 a processing unit that, when a connection of a mobile station is switched from a first base station to a second base station, selects the second base station from a plurality of base stations according to connection history information indicating a success or a failure of past switching of the connection from the first base station to at least one of the plurality of base stations; wherein
 the first base station, when receiving a measurement report from a mobile station in connection to a desired base station apparatus, transmits information of whether or not a same spreading code is assigned to the desired base station apparatus and another base station apparatus, to the gateway apparatus; and
 the processing unit selects the second base station using the connection history information from the base station assigned with a spreading code that is same as the spreading code of the base station transmitted by the mobile station for notifying the base station that satisfies a condition to switch the connection among the plurality of base stations.

7. The mobile communication system according to claim 6, wherein the processing unit preferentially selects the base station with a relatively high success rate of the connection as the second base station in the connection history information.

8. The mobile communication system according to claim 6, wherein when the mobile station notifies information on a frequency of the base station that satisfies the condition to switch the connection, the processing unit selects the second base station from the base stations that use the same frequency as the frequency among the plurality of base stations.

9. A mobile communication system comprising:
 a first base station that generates a first cell and can be connected to a mobile station; and
 a gateway apparatus that communicatively connects the first base station and a plurality of base stations to a higher-level network;
 a processing unit that, when a connection of a mobile station is switched from a first base station to a second base station, selects the second base station from a plurality of base stations according to connection history information indicating a success or a failure of past switching of the connection from the first base station to at least one of the plurality of base stations; wherein
 the first base station apparatus transmits a spreading code and frequency information that is used by the first base station apparatus, to the gateway apparatus; and
 the processing unit selects the second base station using the connection history information from the base station assigned with a spreading code that is same as the spreading code of the base station transmitted by the mobile station for notifying the base station that satisfies a condition to switch the connection among the plurality of base stations.

10. The mobile communication system according to claim 9, wherein the processing unit preferentially selects the base station with a relatively high success rate of the connection as the second base station in the connection history information.

11. The mobile communication system according to claim 9, wherein when the mobile station notifies information on a frequency of the base station that satisfies the condition to switch the connection, the processing unit selects the second base station from the base stations that use the same frequency as the frequency among the plurality of base stations.

12. An operation method for a first base station apparatus, including transmitting, when receiving a measurement report from a mobile station in connection to a desired base station apparatus, information of whether or not a same spreading code is assigned to the desired base station apparatus and another base station apparatus, to a processing apparatus that, when a connection of a mobile station is switched from a first base station to a second base station, selects the second base station from a plurality of base stations according to connection history information indicating a success or a failure of past switching of the connection from the first base station to at least one of the plurality of base stations, wherein the processing apparatus selects the second base station using the connection history information from the base station assigned with a spreading code that is same as the spreading code of the base station transmitted by the mobile station for notifying the base station that satisfies a condition to switch the connection among the plurality of base stations.

13. The operation method according to claim 12, wherein the first base station apparatus incorporates the information of whether or not the same spreading code is assigned into RUA:DIRECT TRANSFER and transmits the RUA:DIRECT TRANSFER including that information.

14. The operation method according to claim 12, wherein the first base station apparatus compares spreading code information received from the mobile station with a list of neighbor base stations held by the base station apparatus, and thereby determines whether or not the same spreading code is assigned to the desired base station apparatus and the another base station apparatus.

15. An operation method for a first base station apparatus, including transmitting a spreading code and frequency information that is used by the first base station apparatus, to a processing apparatus that, when a connection of a mobile station is switched from a first base station to a second base station, selects the second base station from a plurality of base stations according to connection history information indicating a success or a failure of past switching of the connection from the first base station to at least one of the plurality of base stations, wherein the processing apparatus selects the second base station using the connection history information from the base station assigned with a spreading code that is same as the spreading code of the base station transmitted by the mobile station for notifying the base station that satisfies a condition to switch the connection among the plurality of base stations.

16. The operation method according to claim 15, wherein the first base station apparatus incorporates the spread code and the frequency information into a HNB REGISTER REQUEST message and transmits the HNB REGISTER REQUEST message including the spread code and the frequency information.

* * * * *